(12) United States Patent
Jalagadugula et al.

(10) Patent No.: US 12,292,914 B2
(45) Date of Patent: May 6, 2025

(54) MESSAGE PLATFORM FOR AUTONOMOUS ENTITIES

(71) Applicant: SAP SE, Walldorf (DE)

(72) Inventors: Rohit Jalagadugula, Visakhapatnam (IN); Kavitha Krishnan, Bangalore (IN); Sai Hareesh Anamandra, Bengaluru (IN); Akash Srivastava, Lucknow (IN); Gopi Kishan, Raxaul (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/117,284

(22) Filed: Mar. 3, 2023

(65) Prior Publication Data

US 2024/0296180 A1 Sep. 5, 2024

(51) Int. Cl.
| | | |
|---|---|---|
| *G06F 16/35* | (2019.01) | |
| *G06F 16/355* | (2025.01) | |
| *G06F 16/36* | (2019.01) | |
| *G06F 16/383* | (2019.01) | |

(52) U.S. Cl.
CPC .......... *G06F 16/355* (2019.01); *G06F 16/367* (2019.01); *G06F 16/383* (2019.01)

(58) Field of Classification Search
None
See application file for complete search history.

(56) References Cited

U.S. PATENT DOCUMENTS

| | | | | |
|---|---|---|---|---|
| 11,501,084 | B1* | 11/2022 | Soleimani | G06F 40/30 |
| 2017/0012916 | A1* | 1/2017 | Lieu | H04L 51/18 |
| 2017/0310628 | A1* | 10/2017 | Norwood | H04L 12/1859 |
| 2020/0213255 | A1* | 7/2020 | Cullen | H04L 67/10 |
| 2020/0241942 | A1* | 7/2020 | Crouse | G06F 9/544 |

OTHER PUBLICATIONS

Purvis, "Modern PLCs Simplify Cloud-Based IIoT," *Machine Design*, https://www.machinedesign.com/automation-iiot/article/21169692/automationdirect-modern-plcs-simplify-cloudbased-iiot, 12 pages, Jul. 14, 2021.
Wikipedia, "Latent Dirichlet Allocation," https://en.wikipedia.org/wiki/Latent_Dirichlet_allocation, 8 pages (accessed Dec. 19, 2022).
Sagar, "What Is Contrastive Learning?," Developers Corner, https://analyticsindiamag.com/category/developers_corner/, 23 pages, May 31, 2020.

(Continued)

*Primary Examiner* — Scott A. Waldron
(74) *Attorney, Agent, or Firm* — Klarquist Sparkman, LLP

(57) ABSTRACT

A computer-implemented method can receive a message sent from a source entity, perform first pre-processing operations for verifying validity of the message, perform second pre-processing operations for determining a category of the message, extract metadata from the message, generate an enriched message comprising the metadata and the determined category, perform post-processing operations for classifying the enriched message into one of a plurality of event types, broadcast the enriched message to a message broker, and routing, by the message broker, the enriched message to one or more target entities registered an event type into which the message is classified.

18 Claims, 9 Drawing Sheets

(56) References Cited

OTHER PUBLICATIONS

Arora, "Edge Computing Vs. Cloud Computing: Key Differences to Know," https://www.simplilearn.com/edge-computing-vs-cloud-computing-article, 9 pages, Sep. 28, 2022.

Wikipedia, "Advanced Message Queuing Protocol," https://en.wikipedia.org/wiki/Advanced_Message_Queuing_Protocol, 8 pages (accessed Jan. 23, 2023).

"Example of using the REST API to retrieve field metadata," https://docs.bmc.com/docs/ars2002/example-of-using-the-rest-api-to-retrieve-field-metadata-909638136.html, 12 pages (accessed Jan. 23, 2023).

"Event-driven architecture with Pub/Sub," https://cloud.google.com/solutions/event-driven-architecture-pubsub#, 14 pages (accessed Jan. 23, 2023).

Chen et al., "A Simple Framework for Contrastive Learning of Visual Representations," *Proceedings of the 37$^{th}$ International Conference on Machine Learning*, 11 pages, 2020.

\* cited by examiner

510

| id | Conditions machine_id | region | sector | Actions allowed_suppliers |
|---|---|---|---|---|
| 1 | 6416-p350-sf67 | ID | n/a | First Trust New Opportunities MLP & Energy Fund |
| 2 | 671x-u205-sf17 | GT | Finance | Bank Mutual Corporation |
| 3 | 894v-b977-im29 | DJ | Consumer Durables | KAR Auction Services, Inc |
| 4 | 956g-q744-kr92 | CN | Miscellaneous | Accenture plc |
| 5 | 257k-i981-jt72 | TK | Capital Goods | China XD Plastics Company Limited |
| 6 | 164h-i745-ky96 | GR | Finance | Northeast Bancorp |
| 7 | 0540-g977-ex48 | SE | Miscellaneous | Kingold Jewelry Inc. |
| 8 | 069s-k739-ei00 | KW | Consumer Services | Abercrombie & Fitch Company |
| 9 | 820k-x476-ha17 | CN | Consumer Services | CIM Commercial Trust Corporation |
| 10 | 836y-r580-ta09 | RS | Miscellaneous | Global Payments Inc. |

520

| id | Conditions machine_id | temperature | pressure | anomaly | Actions request_for_maintenance |
|---|---|---|---|---|---|
| 6 | 9g08-l4q5m-98r9 | 15-25 | <60 | TRUE | 12/10/22 |
| 7 | 525v-z419-vr30 | 55-85 | >60 | FALSE | 15/10/22 |
| 2 | 721d-c844-jl75 | <90 | <20 | FALSE | 16/10/22 |
| 1 | 785y-a337-ob45 | <75 | <80 | TRUE | 26/10/22 |
| 10 | 277m-t162-za57 | >80 | >30 | FALSE | 26/10/22 |

610
{
  "machine_id": "9g08-l4q5m-98r9",
  "temperature": 17.42,
  "pressure": 57.49,
  "ip_address": "162.55.169.210"
}

620
{
  "machine_id": "9g08-l4q5m-98r9",
  "temperature": 17.42,
  "pressure": 57.49,
  "alert": true,
  "ip_address": "162.55.169.210"
}

630
{
  "machine_id": "9g08-l4q5m-98r9",
  "temperature": 17.42,
  "pressure": 57.49,
  "alert": true,
  "topic": "Maintenance",
  "priority": "Urgent",
  "supplier_preference": "Delivery",
  "ip_address": "162.55.169.210"
}

MESSAGE PLATFORM FOR AUTONOMOUS ENTITIES

BACKGROUND

Industrial automation can reduce the involvement of people in manufacturing processes, which can lead to improved data accuracy and work safety, optimize resource utilization, and reduce errors and inefficiency, among many other benefits. The Internet of Things (IoT) is a key driving factor in enabling the development of industrial automation systems. Specifically, IoT technologies can tie machines, components, and/or other entities together by networks, using various wireless and wireline technologies, standards, and protocols to provide pervasive connectivity, thereby allowing data transfer over a network without requiring human-to-human or human-to-computer interactions. However, in a heterogeneous environment, different entities residing in distributed networks often have different needs and/or capacities. Establishing meaningful communications between different entities to support entity automation thus can be challenging. Thus, there remains a need for an improved system and method to support entity automation in a heterogeneous environment.

BRIEF DESCRIPTION OF THE DRAWINGS

FIG. 5 depicts two example sets of object policies.

FIG. 6 depicts example metadata and content of a message and incremental enrichment of the message after certain preprocessing steps.

DETAILED DESCRIPTION

Figure 1:
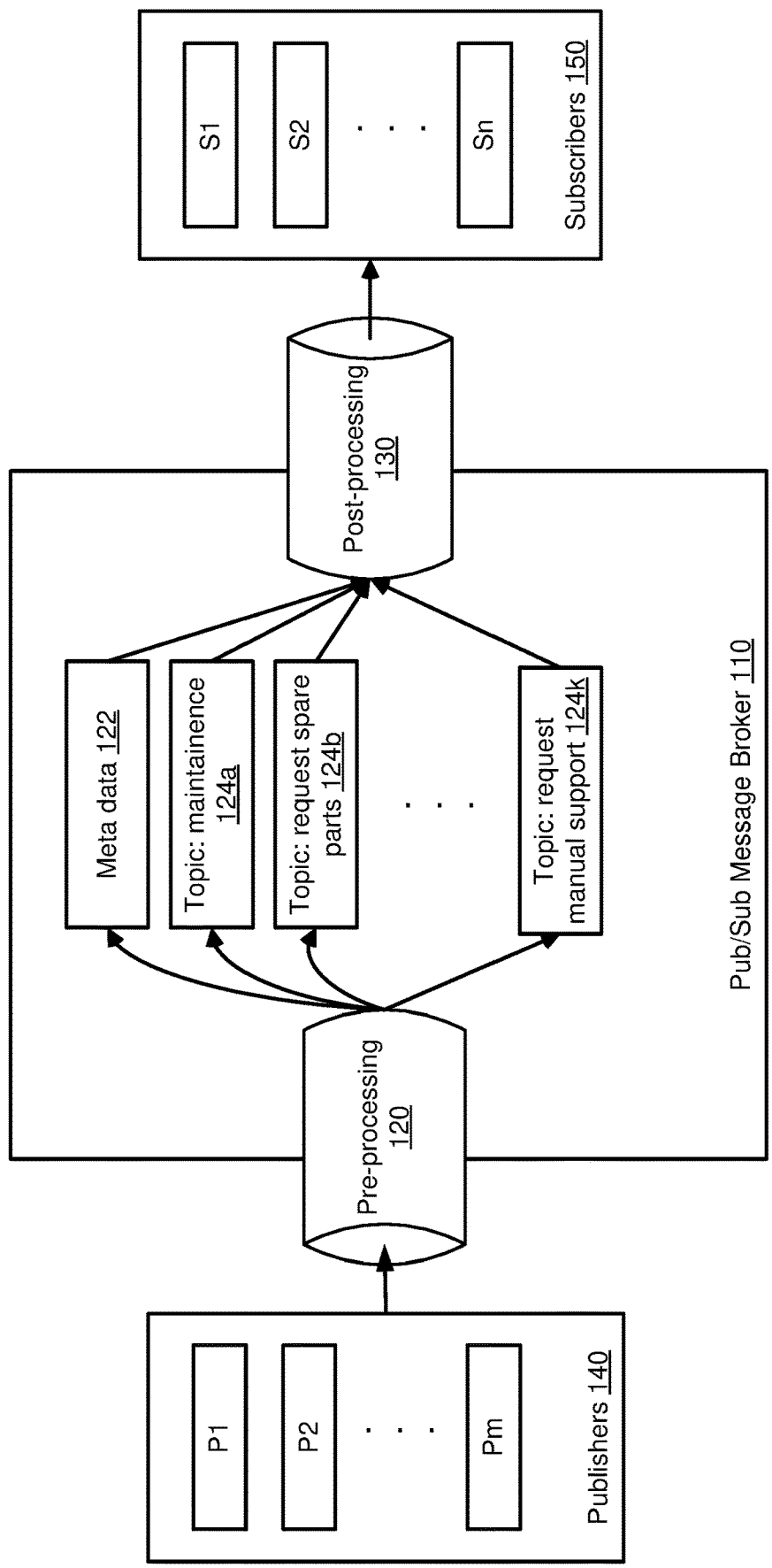
FIG. 1 is an overall block diagram of an example computing system configured to support entity automation using a message platform.

Example 1—Overview of Entity Communication and Automation

Although tremendous progress has been made in industrial automation, manual operation is still prevalent today to handle various service requests pertaining to manufacturing processes. For example, human labor is often involved in periodically evaluating operating conditions and/or arranging maintenance for certain entities, such as machines, equipment, devices, plants, etc. As another example, some entities may generate ad hoc requests for human intervention, such as replacing worn-out components, replenishing supplies, fixing bugs, etc. In any of these examples, users are often called upon to identify and contact other entities (e.g., service providers) to book corresponding services to address the needs (e.g., performing maintenance for the entities, supplying components or materials, repairing or fixing issues, etc.).

In any of the examples described herein, entities that generate requests or demands for services are referred to as source entities, whereas entities that provide services in response to the requests or demands are referred to as target entities. For example, the source entities can be machines, equipment, plants, etc., and the target entities can be component suppliers, technical supports, etc.

In some cases, an entity can simultaneously be a source entity in one scenario and a target entity in another scenario. For example, a machine repair provider may offer repair services for some entities (thus, acting as a target entity), and also may require components/suppliers from other entities (thus, acting as a source entity). In another example, a machine which experienced a malfunction and requested a service to solve the problem (thus, acting as a source entity), may later offer solutions it has learned through the service to another similar machine which experienced a similar malfunction (thus, acting as a target entity). In the latter case, the knowledge gained by the first machine (through the service it received) can be later shared with other similar machines.

The introduction of IoT, e.g., by embedding sensors (and in some circumstances, microprocessors) in machines, equipment, etc., has enabled certain degrees of automation at the side of source entities (e.g., automatic reminder for regular maintenance, automatic warning of component failure and/or supply shortage, automatic detection of abnormalities, etc.). However, up to now, finding target entities to address the requests generated by the source entities still involves a lot of manual work. This problem is particularly pertinent in a heterogenous computing environment involving thousands of different entities residing a distributed network, where entity-to-entity communication can be limited or restricted due to heterogenous hardware/software interfaces, communication standards and/or protocols, organizational policies, etc. As a result, human interaction is often needed to resolve these issues to enable the communication between source entities and target entities. For example, even if a source entity detects a need to replace a worn-out component, potential target entities may not be aware of the source entity's need until being notified by a user who receives an alert from the source entity. As another example, even if a first device received a debug service to resolve an issue, unless being notified of the first device's service history, a similar second device experiencing the same issue may request the same debug service again.

The technologies described herein can resolve many of the technical problems described above by building a message platform which enables efficient entity-to-entity communication, thereby allowing the source and target entities to be more autonomous. Conceptually, the message platform described herein acts as a decentralized BPaaS (business process as a service) marketplace where different players (e.g., individuals, plants, factories, organizations, suppliers, buyers, and other networks such as SAP Ariba Network, SAP Asset Intelligence Network, etc.) can opt in. Such a decentralized BPaaS marketplace can cut across organization's values chains and act as an engagement layer where the different entities can connect and communicate effectively to automatically address or resolve issues with minimal human interactions.

Example 2—Example Overview of Computing System with Message Platform Supporting Entity Automation FIG. 1 shows an overall block diagram of an example computing system 100 providing a message platform in support of entity automation.

As shown, the message platform can include a publication-subscription message broker 110. In some examples, organizations that want to use the computing system 100 to support entity automation must first register with the message platform. Entities of registered organizations can then subscribe and be linked to the message platform.

For example, a plurality of entities (e.g., e.g., P1, P2, . . . , Pm, S1, S2, . . . , Sn) of registered organizations can communicate with each other through the message broker 110. Some entities (e.g., P1, P2, . . . , Pm) are source entities which can generate requests for services. The generated service requests can be constructed as messages which are sent to the message broker 110. Thus, the source entities can also be referred to as publishers 140. Some entities (e.g., S1, S2, . . . , Sn) are target entities which can provide services in response to requests sent from the source entities. The target entities subscribe to the message broker 110 in order to receive certain types of messages sent from the publishers 140. Thus, the target entities can also be referred to as subscribers 150. Although the entities are classified into publishers 140 and subscribers 150 in the depicted example, it is to be understood that, in some circumstances, an entity can act as both a source entity and a target entity as described above. Thus, an entity can change its role (e.g., from a publisher to a subscribe or vice versa) depending on circumstances.

Each message sent from one of the publishers 140 (e.g., P1, P2, . . . , Pm) can be first processed by a pre-processing unit or engine 120. Successful pre-processing of the message can extract metadata 122 from the message and further classify the message into one of a plurality of topics 124a, . . . , 124k (collectively, 124). In some examples, representational state transfer (REST) application programming interface (API) can be used to retrieve field metadata from the message. Example topics include "maintenance," "request spare parts," "trouble shooting," "request manual support," etc. The message can be enriched by incorporating the classified topic 124, along with some other relevant information. The enriched message (including the metadata 122 and the classified topics 124) can be processed by a post-processing unit or engine 130, which can further classify the message into one of a plurality of service types (also referred to as "event types"). The enriched message with the classified service types can be broadcasted by the message broker 110, e.g., sent to a message queue connected to at least some of the subscribers 150. When subscribing to the message broker 110, each subscriber (e.g., S1, S2, . . . , Sn) can register or subscribe to one or more service types. Thus, the enriched message having a specific service type can be routed to selected subscribers who have registered or subscribed to the specific service type. In other words, only subscribers who have registered or subscribed to the specific service type can receive the enriched message originated from one of the publishers. The subscribers receiving the enriched message can then initiate actions responding to the publisher's request (e.g., contacting the publisher and offering corresponding service, etc.).

In some examples, the message broker 110, the pre-processing unit 120, and the post-processing unit 130 can be implemented in the cloud, wherein each of the entities subscribing to the message platform can have a local computing unit configured for edge computing, such as collecting sensor data, generating/receiving messages of particular format, etc.

In practice, the systems shown herein, such as system 100, can vary in complexity, with additional functionality, more complex components, and the like. For example, there can be additional functionality within the message broker 110. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the messages, metadata, topics, service types, and the like can be stored in one or more computer-readable storage media or computer-readable storage devices. The technologies described herein can be generic to the specifics of operating systems or hardware and can be applied in any variety of environments to take advantage of the described features.

Example 3—Example Functional Components of Message Platform

Figure 2:
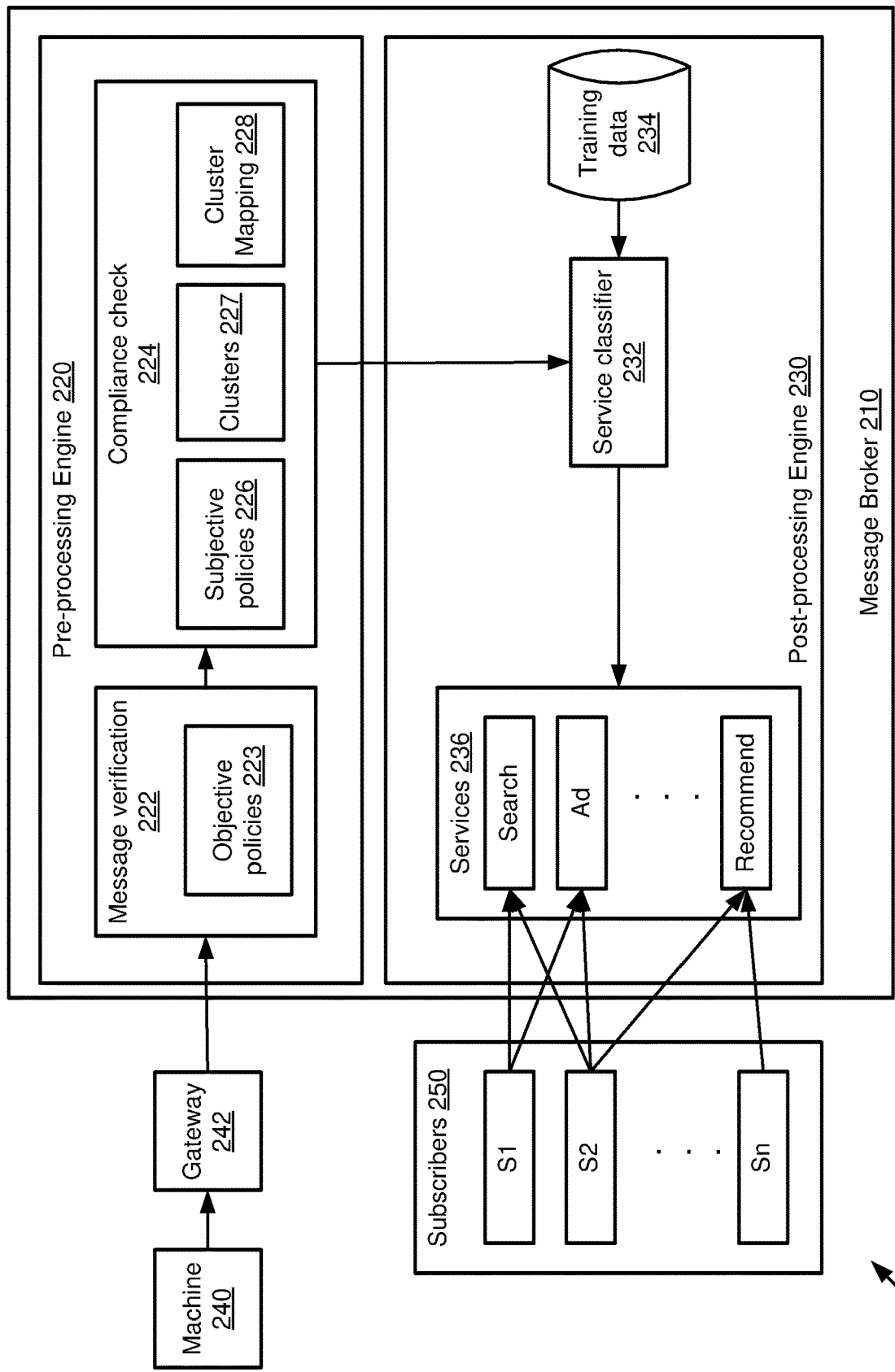
FIG. 2 is an example block diagram illustrating some functional components of a message platform.

FIG. 2 illustrates some functional components of a message platform 200 which can be used in the computing system 100 of FIG. 1. In this example, a machine 240 is used to represent a source entity or publisher which can establish communications, through a message broker 210, with one or more target entities or subscribers 250 which subscribe to the message broker 210.

The machine 240 can send or publish a message to the message broker 210 through an API or gateway 242. In some examples, the message published by the machine 240 can follow the Advanced Message Queuing Protocol (AMQP). The message received by the message broker 210 can be first processed by a pre-processing engine 220, and if successful, then further processed by a post-processing engine 230, as described more fully below.

The pre-processing engine 220 can include a message verification unit 222 and a compliance check unit 224. The message verification unit 222 can be configured to verify the validity of the message based on a plurality of predefined objective policies 223. If the message is successfully verified against the objective policies 223, the message can be further evaluated by the compliance check unit 224 to determine if the message is compliant with a set of subjective policies 226. Such compliance check can be performed by a cluster mapping unit 228 which maps the message into one of a plurality of clusters 227, as described more fully below. The results of message verification and compliance check can be added to the payload of the message, thereby resulting in an enriched message.

As described herein, the message platform 200 holds all policies (including both objective policies and subjective policies) of participating organizations (i.e., organizations that are registered with the message platform 200). Entities of the participating organizations can communicate with each other and external participants within the boundaries of the defined policies (e.g., each communicating message must be valid according to objective policies and compliant with subjective policies).

Generally, each participating organization can define its own policies when registering with the message platform 200. For example, a participating organization can provide a policy to specify allowed suppliers for certain parts, or define conditions for triggering an alert or warning (e.g., indicating machine failure, etc.). As another example, a participating organization can provide a written policy that specifies some general operating principles, e.g., a component can only be sourced from certain regions or countries, a service provider must have certain certifications and/or ratings, etc.

The enriched message can be sent to a service classifier 232 of the post-processing engine 230. The service classifier 232 can be trained to classify an input message into one of a plurality of event types or service types 236 that are available on the message platform 200, such as a search request, an ad service request, a recommendation request, etc. The enriched message with the classified service types can be broadcasted by the message broker 110, e.g., through a message queue connected to the subscribers 250. Each of the subscribers 250 subscribing to the message broker 210 can register one or more of the service types 236. Thus, the enriched message having a particular service type can be routed to selected subscribers who have registered the particular service type. As a result, communications can be established between the machine 240 requesting a specific service and one or more subscribing entities that are capable of providing the specific service.

In certain examples, the service classifier 232 is a supervised machine learning (ML) model that can be trained using collected training data 234. The collected training data 234 can include a corpus of previous received enriched messages (e.g., published by a plurality of source entities and enriched by the pre-processing engine 220) and the resulting services ultimately selected in response to the received messages. For model training purposes, some selections of the services can be performed manually. Previously received enriched messages can be fed to the input end of the ML model and the selected services can be fed to the output end of the ML model. After a number of iterations, the ML model can be trained to predict a service selection based on an input enriched message.

Figure 3:
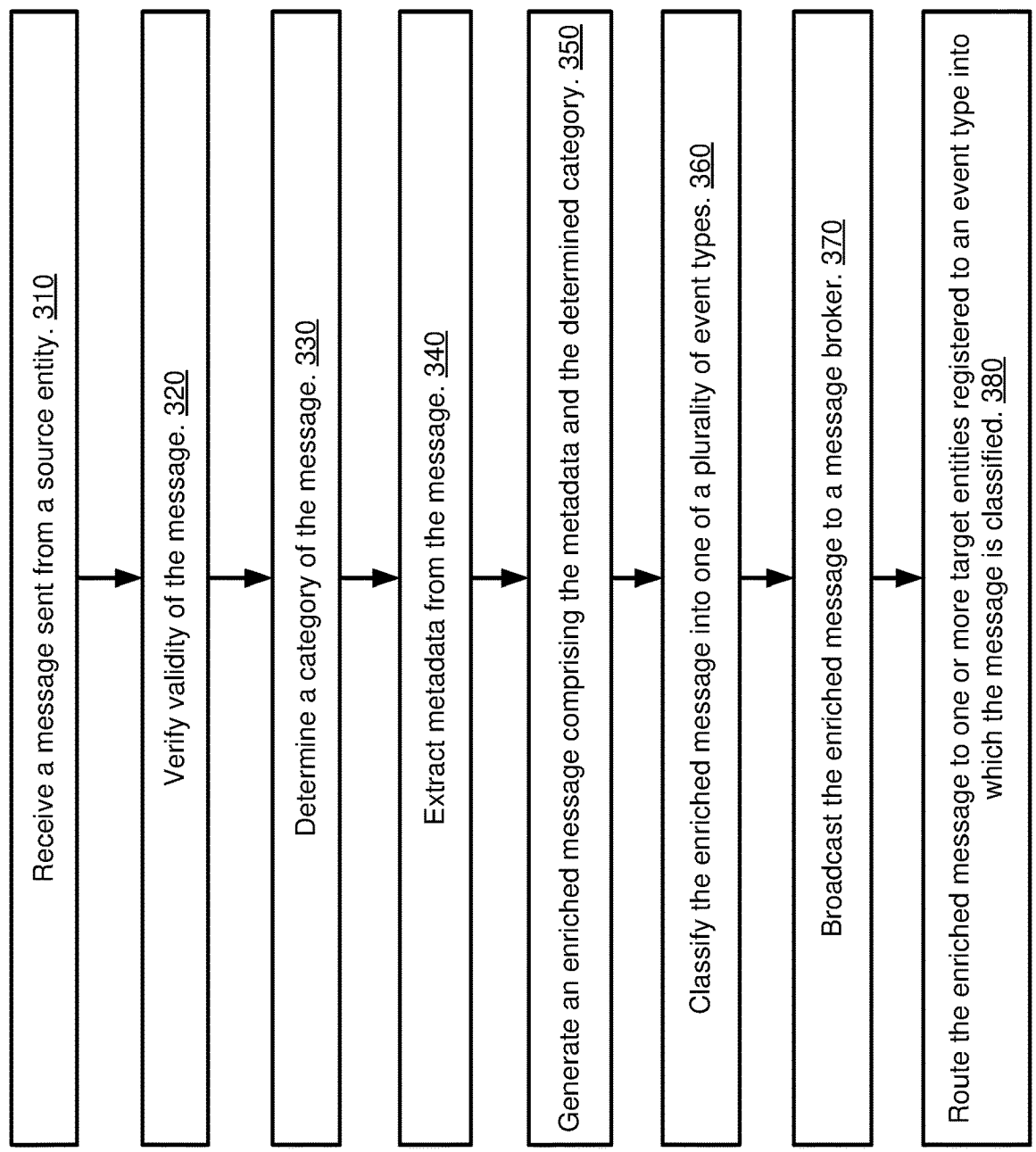
FIG. 3 is a flowchart illustrating an example overall method of establishing message communications between a source entity and one or more target entities.

Example 4—Example Overall Method of Establishing Message Communications Between Entities FIG. 3 is a flowchart of an example overall method 300 of establishing message communications between entities, and can be performed, e.g., by the computing system 100 of FIG. 1 and/or the message platform 200 of FIG. 2.

At 310, a message can be received from a source entity (e.g., machine 240).

At 320, the method can perform first pre-processing operations for verifying validity of the message, e.g., by checking against a plurality of objective policies, as described further below. Verifying the validity of the message can be performed by the pre-processing engine 220, or more particularly, e.g., by the message verification unit 222.

At 330, the method can perform second pre-processing operations for determining a category of the message. As described further below, the message platform can generate a plurality of topic clusters and one non-topic cluster from a text corpus of public policies. The determined category is mapped to one of the clusters. The message is deemed to be compliant with the public policies only if the message is mapped to one of the topic clusters. Determining the category of the message can be performed by the pre-processing engine 220, or more particularly, e.g., by the compliance check unit 224.

At 340, metadata can be extracted from the message. In some examples, extracting the metadata from the message can be performed by the pre-processing engine 220.

At 350, the method can generate an enriched message comprising the metadata and the determined category. In some examples, the message can be enriched by the pre-processing engine 220, or more particularly, e.g., by both the message verification unit 222 and the compliance check unit 224.

At 360, the method can perform post-processing operations for classifying the enriched message into one of a plurality of event types. Classifying the enriched message can be performed by the post-processing engine 230, or more particularly, e.g., the service classifier 232.

At 370, the enriched message can be broadcasted by a message broker (e.g., 210).

At 380, the message broker can route the enriched message to one or more target entities registered an event type into which the message is classified. As a result, communications between the source entity and the one or more target entities can be established.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 5—Example Pre-Processing Operations

Figure 4:
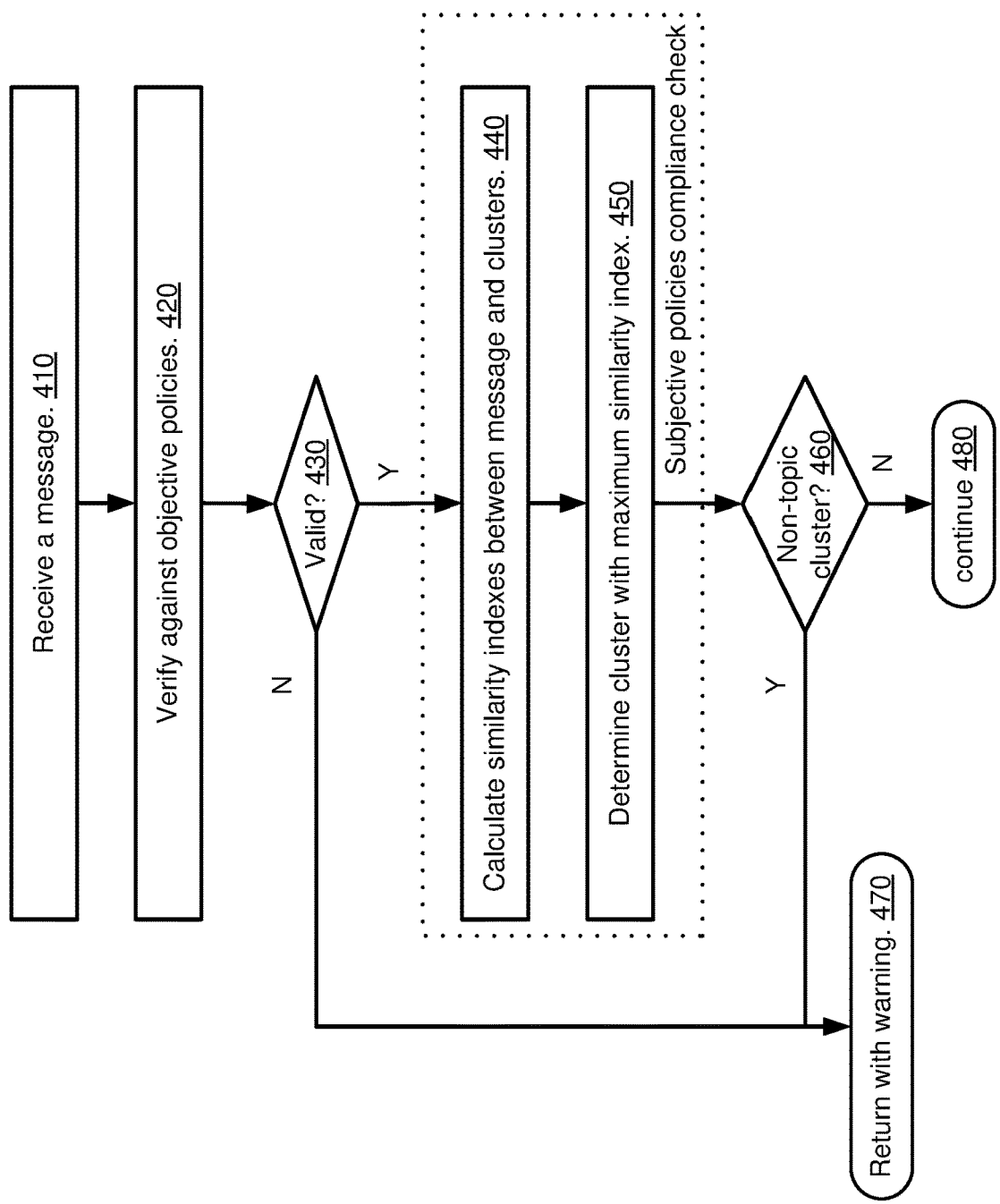
FIG. 4 is a flowchart illustrating example pre-processing operations that can be performed on a message platform.

FIG. 4 is a flowchart 400 illustrating example message pre-processing operations, and can be performed, e.g., by the pre-processing engine 120 or 220 described above.

At 410, a message can be received from a source entity.

At 420, the received message can be verified against one or more objective policies. As described further below, the objective polices can have two types. One type of objective policies can be used check the validity of the message, and another type of objective policies can be used to generate additional attributes for enriching the message.

At 430, a condition check 430 can be performed to determine if the message is deemed to be valid based on the verification result of 420. If the message does not pass the verification test, the method can return and generate a warning at 470 (e.g., indicating the message violates certain objective policies) and no further processing of the message follows.

On the other hand, if the message is deemed to be valid, then the message can be further checked against a plurality of subjective policies to determine if the message is compliant with those subjective policies. In some examples, the compliance check can map the message to one of a plurality of pre-determined clusters (including multiple topic clusters and one non-topic cluster) which are generated based on the plurality of subjective policies, as described further below.

For example, at 440, the method can calculate similarity indexes between the message and each of the plurality of pre-determined clusters.

Then at 450, the maximum similarity index can be determined, and the message can be mapped to the cluster associated with the maximum similarity index.

At 460, another condition check can be performed to determine if the cluster to which the message is mapped is the non-topic cluster. If yes, then the method can return and generate a warning at 470 (e.g., indicating the message is not compliant with the subjective policies) and no further processing of the message follows. Otherwise, the message can be further enriched with additional information (e.g., the cluster mapping result, etc.) for post-processing operations such as service classification (e.g., performed by the post-processing engine 130 or 230 described above).

Example 6—Example Objective Policies

In any of the examples herein, objective policies (e.g., 223) can be a set of predefined rules that are applied to the received messages. In some examples, a rule-based engine or regular expressions can be used to verify or check a received message against the objective policies. The output of the message verification unit (e.g., 222) can be the conjunction (e.g., logical AND) of all such objective policies.

In some examples, some of the objective policies or rules can be used to verify the validity of the received messages. These objective policies can also be referred to as validity rules. The message can be further processed only when the message is deemed to be valid, i.e., the message successfully satisfies all these validity rules. For example, one object policy or validity rule can set a maximum limit of a message is 250 characters. If the message's length is longer than the maximum limit, the message can be deemed invalid and a warning can be generated, and the message will not be processed further. As another example, one objective policy or validity rule may require that the payload of the message must follow a specific format and will reject the message if such validity rule is violated.

In some examples, some objective policies or rules can be applied to the received message to derive new characteristics or attributes. These objective policies can also be referred to as derivative rules. The derived characteristics or attributes can be added to the message (along with corresponding attribute values) so that the message is enriched with new information. Such added information can be helpful for post-processing operations to classify the message into one of the event types or service types (e.g., 236).

For example, FIG. 5 shows two tables 510 and 520, each of which contains a plurality of objective policies or derivative rules that are specific to particular machines (e.g., identified by the machine_id column). In the depicted example, each row of the table 510 defines an objective policy or derivative rule which specifies allowed suppliers for a particular machine, and each row of the table 520 defines an objective policy or derivative rule for detecting anomaly of a particular machine.

Each of the objective policy or derivative rule listed in tables 510 and 520 can be expressed in a conditional statement. For example, the first row of table 520 defines a rule which can be expressed as the following conditional statement: "if the machine_id=9g08-14q5m-98r9 AND temperature is between 15 and 25 degrees AND pressure <60 psi, then anomaly=TRUE." Thus, when a message published by a machine is tested against the objective policies or derivative rules defined in table 520, a new characteristic or attribute "anomaly" or the like can be generated if an object policy or derivative rule specific to the machine is found in the table 520. One example is depicted in FIG. 6, which shows an original message 610 published by a machine. The payload of the message 610 indicates that the machine has a machine_id 9g08-14q5m-98r9 with a specific IP address, and the machine has a temperature of 17.42 degree and a pressure of 57.49 psi (e.g., measured by temperature and pressure sensors embedded in the machine). After testing the message 610 against the objective policies or derivative rules defined in table 520, the message 610 can be expanded to an enriched message 620, which includes a new attribute "alert" and a corresponding Boolean value "true" because the machine's temperature and pressure meet the "anomaly" criteria defined in table 520.

Other attributes can be similarly added to the message. For example, the first row of table 510 defines a rule which can be expressed as the following conditional statement: "if machine_id=641f-p050-s167, then allowed_suppliers=First Trust New Opportunities MLP & Energy Fund." Thus, when a message published by a machine is tested against the objective policies or derivative rules defined in table 510, a new attribute "allowed_suppliers" or the like can be generated if an object policy or derivative rule specific to that machine is found in the table 510. Similarly, this newly generated attribute and its corresponding values (e.g., the names of allowed suppliers for the machine) can be added to the message so that the message is enriched with such new information.

As described above, metadata can be extracted from the messages. Such metadata include not only attributes of original messages (e.g., machine_id, temperature, pressure, ip_address, etc.), but also attributes (e.g., alert, etc.) added to the enriched message.

Figure 7:
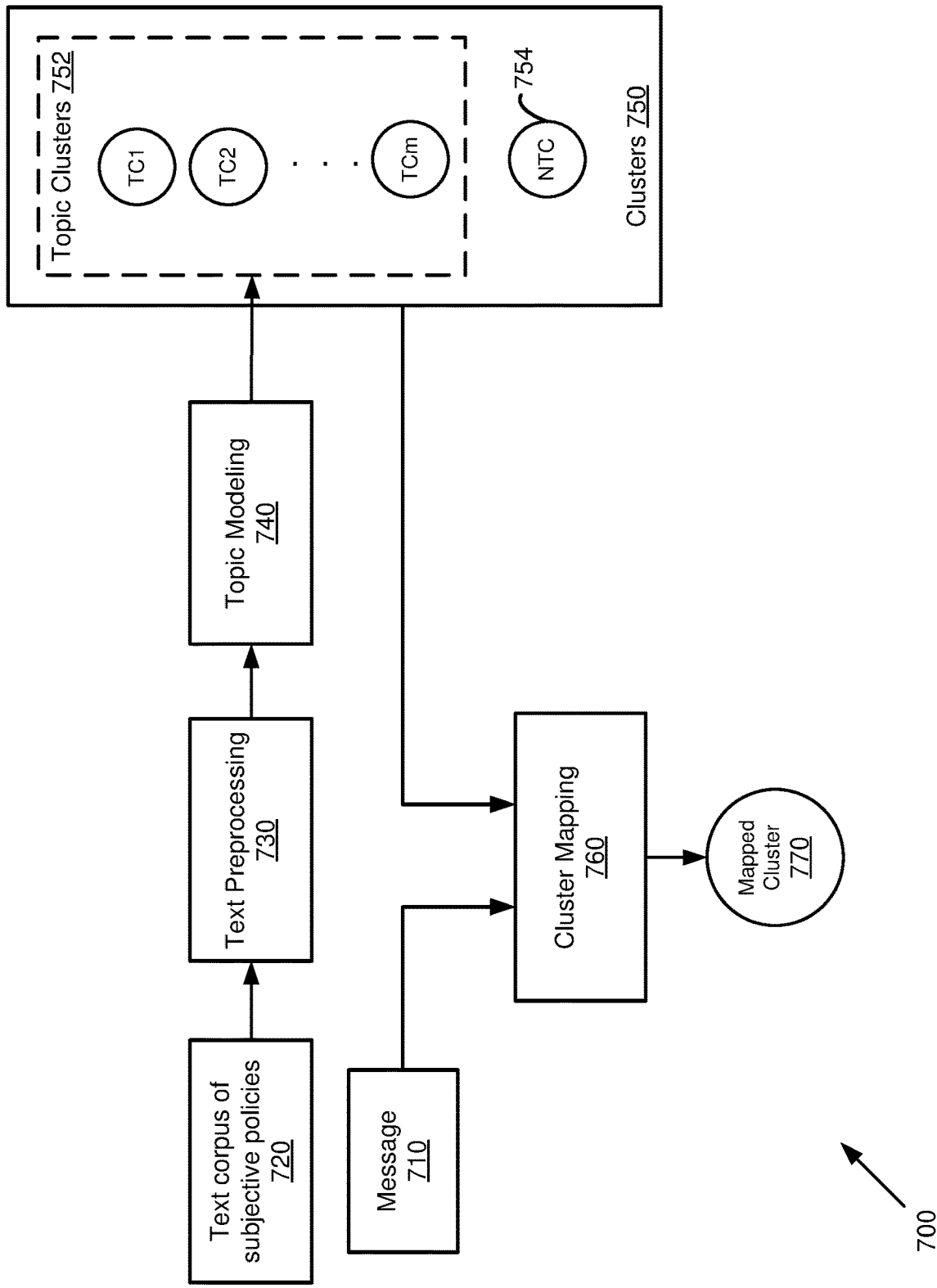
FIG. 7 is a block diagram depicting an example method for evaluating compliance of a message against some subjective polices.

Example 7—Example Method of Checking Message Compliance with Subjective Policies FIG. 7 is a block diagram illustrating an example method for checking a message's compliance with some subjective polices, and can be performed, e.g., by the compliance check unit 224 of FIG. 2.

As described herein, subjective policies refer to text-based documents describing some general or overarching operational principles or considerations of an organization. Different objective policies described above, which can be expressed in logical rules or regular expressions, the subjective policies are expressed in free-form or unstructured text. For example, a participating organization's subjective policies can have statements like "the suppliers of our products should be limited to EU countries," "the companies assembling our products must have ISO 9001 certification or equivalent," "suppliers who can provide delivery service should be preferred," "A has a higher priority than B," etc.

As shown, a plurality of subjective policies can be grouped together to form a text corpus 720, which can be transformed by a text pre-processing unit 730. In some examples, the text pre-processing module 730 can clean the text corpus 720, e.g., transforming text data into all lower case, removing certain punctuation or special characters, keeping only upper- or lower-case words, removing stop words (e.g., certain meaningless words such as conjunctions, articles, etc.), merging words that are similar in meaning, converting prices into a common currency, etc.

The output of the text pre-processing unit 730 can be fed to the input of a topic modeling unit 740 which is configured to perform unsupervised classification of transformed text corpus data generate a plurality of topic clusters 752, e.g., TC1, TC2, . . . , TCm. In some examples, the topic modeling unit 740 can use latent Dirichlet allocation (LDA) method to generates the topic clusters 752. The LDA is a generative statistical model which can explain words in transformed text corpus data through unobserved topic clusters, wherein each word's presence in attributable to the one of the topic clusters 752. Each topic cluster can be assigned a topic name and include a plurality of words that are most probable words to appear in that topic cluster. Example topic names include "maintenance," "request spare parts," "trouble shooting," "request manual support," etc.

Besides the topic clusters 752 generated by the topic modeling unit 740, another non-topic cluster (NTC) 754 can be created. Collectively, the topic clusters 752 and non-topic cluster 754 are indicated in FIG. 7 as clusters 750. The non-topic cluster 754 can include words that are least likely to appear in any of the topic clusters 752. In some examples, the non-topic cluster 754 can be manually created. In some examples, the non-topic cluster 754 can be automatically generated from received messages, e.g., by identifying words in the messages that are missing in the text corpus 720 or topic clusters 752. In other words, the non-topic cluster 754 represents a collection of words that are adversarial and/or absent from the public policies.

The clusters 750 can be created in advance. Once created, the clusters 750 can be used for message mapping. For example, each message 710 can be mapped to one of the topic clusters 752 or the non-topic cluster 754 using a cluster mapping unit 760. The output of the cluster mapping unit 760 is a mapped cluster 770 to which the message 710 is mapped. In the depicted example, the message 710 represents an output of a message verification unit (e.g., 222), that is, the message 710 has been verified against all objective policies and can be enriched with some additional information compared to the original message sent from a source entity, as described above.

The cluster mapping unit 760 can be configured to implement the subjective polices compliance check depicted in FIG. 4. In some examples, the cluster mapping unit 760 is configured to implement contrastive learning, which is an algorithm that learns, e.g., through word embedding, similar/dissimilar representations from data that are organized into similar/dissimilar pairs.

In some examples, the contrastive learning can calculate a similarly index between each pair of the message 710 and one of the clusters 750 (e.g., step 440 of FIG. 4). For example, if there are m topic clusters 752 and one non-topic cluster 754, a total of m+1 similarity indexes will be calculated. The largest similarity index can then be determined (e.g., step 450 of FIG. 4), and the mapped cluster 770 is associated with the largest similarity index.

As described above in reference to FIG. 4, if the mapped cluster 770 is the non-topic cluster 754, then a warning can be generated to indicate that the message is not compliant with the subjective policies. On the other hand, if the mapped cluster 770 is one of the topic clusters 752, then the topic name of the mapped cluster can be added to the message 710. In some examples, words included in the mapped topic cluster can also be added to the message 710. For example, FIG. 6 shows the payload of an example message 630 which is further enriched from the message 620. In this example, the enriched message 630 includes three additional attributes and corresponding values compared to the message 620 to indicate that the "topic" of the message is "maintenance," the "priority" if "urgent," and the "supplier_preference" is "delivery."

Example 8—Example Post-Processing Operations

As described above with reference to FIG. 2, after successfully message verification and compliance check, the enriched message (including the extracted metadata and attribute values) can be collected and processed through the service classifier 232, which classifies the message into one of a plurality of predefined service types 236 that are available on the message platform 200. Example service types include ad services, search services, recommendation services, anomaly detection services, supply chain disruption alert services, semantic services, etc. In some examples, if the service classifier 232 determines that the message is not related to any of the above listed services, the service classifier 232 can invoke a manual intervention trigger, which alerts that automatic service response is not for the received message and manual intervention is needed.

As described herein, messages published by source entities can be processed by the message broker 210 to classify the messages into corresponding service types. The message broker 210 can then broadcast the messages to various message queues depending on the classified service types. Depending on what services or functionalities the target entities can provide, the target entities can subscribe to relevant message queues to gain access or stream messages with particular service types.

For example, if a message can be classified into one of the available service types, the enriched message together with the classified service type can be broadcasted by the message broker, which can route (e.g., via a corresponding message queue) the enriched message to subscribers who have registered the classified service type. Thus, the message sent by the source entity, together with enriched information, can be communicated to one or more target entities, who can provide corresponding services to the source entity in response to the message. In other words, the message platform 200 can seamlessly invoke corresponding services from target entities after receiving messages from source entities (provided that the messages are valid and compliant with policies), and autonomy can be achieved as a result.

As one example, the message published by the machine 240 may indicate a component needs to be replaced. The message broker 210 may determine that the message has the "request spare parts" topic and further classify and invoke the "ad services." Thus, any of the target entities who has subscribed to the "ad services" can receive the message and respond to the machine 240, e.g., offering the requested spare parts.

As another example, the message published by the machine 240 may indicate a malfunction. The message broker 210 may determine that the message has the "trouble shooting" topic and further classify and invoke the "anomaly detection services." Thus, any of the target entities who has subscribed to the "anomaly detection services" can receive the message and respond to the machine 240, e.g., offering trouble shooting services. In some examples, the target entities subscribing to the "anomaly detection services" can be a service provider who specializes in trouble shooting of machines. In some examples, the target entities subscribing to the "anomaly detection services" can be machines that are similar to the source entity (e.g., machine 240), but having learned from past experience of how to handle similar malfunctions. As a result, knowledge gained by the machines can be shared through the message platform.

Example 9—Example Advantages

A number of advantages can be achieved via the technology described herein. For example, using a message platform described herein, a plurality of heterogeneous entities can communicate with each other in an efficient manner. Specifically, communications between entities are enabled by a publication-subscription message broker. Requests from source entities can be addressed and/or handled based on payload of the message. Within the boundary defined by available policies, the requests can be categorized into different service types and distributed to selected target entities subscribing to respective service types. As a result, the message platform described herein enables and facilitates autonomous entities.

Moreover, through a series of pre-processing operations, the message sent from source entities not only can be checked for validity and compliance based on available policies, but also can be enriched so that additional information can be added to the message. Enriching the message can improve the accuracy of service classification because the input to the service classifier include not only the content of the original message sent from the source entities, but also information derived from the policies available in the message platform (e.g., anomaly detection, general topic, task priority, publisher's preference, etc.).

Further, enriching the message through pre-processing steps can limit the workload to be conducted in the edges. For example, the computing workload in the source entities or publishers can be limited to collecting raw data and generating messages, without additional workload such as checking data validity, anomality detection, topic classification, etc. Complex tasks which requires more computing resources, such as rule-based logical analysis, message classification based on textual analysis or machine learning, etc., can be delegated to the message platform on the cloud. As a result, the computing system described herein (e.g., 100) can be highly scalable. For example, organizations can join the message platform through a registration process. Registered organizations can supply policies (objective and/or public) to the message platform for message verification and/or compliance evaluation purposes. Heterogenous entities of registered organizations can connect to the message platform as either publishers and/or subscribers of selected services based on individual needs.

Example 10—Example Computing Systems

Figure 8:
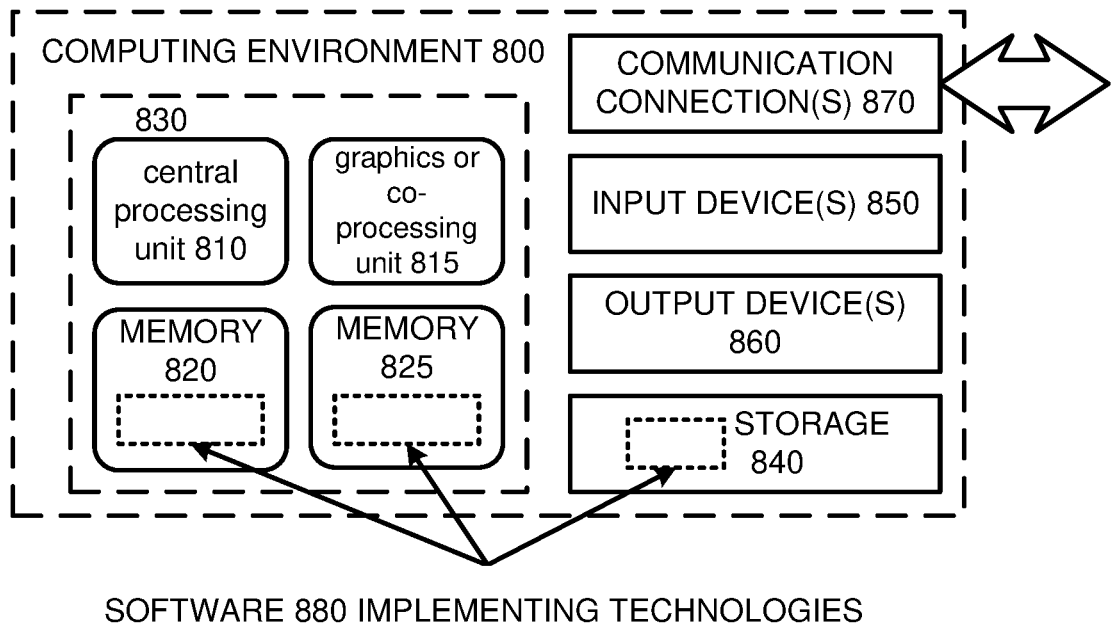
FIG. 8 is a block diagram of an example computing system in which described embodiments can be implemented.

FIG. 8 depicts an example of a suitable computing system 800 in which the described innovations can be implemented. The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 can execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 can store software 880 implementing one or more innovations described herein, in the form of computer-executable instructions suitable for execution by the processing unit(s) 810, 815.

A computing system 800 can have additional features. For example, the computing system 800 can include storage 840, one or more input devices 850, one or more output devices 860, and one or more communication connections 870, including input devices, output devices, and communication connections for interacting with a user. An interconnection mechanism (not shown) such as a bus, controller, or network can interconnect the components of the computing system 800. Typically, operating system software (not shown) can provide an operating environment for other software executing in the computing system 800, and coordinate activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 can store instructions for the software 280 implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 11-Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 12—Example Cloud Computing Environment

Figure 9:
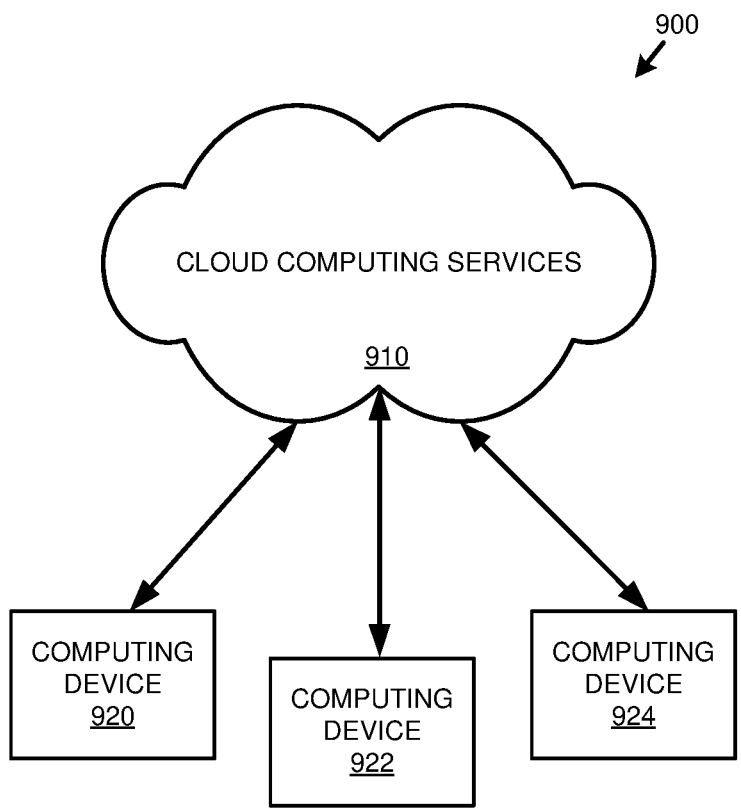
FIG. 9 is a block diagram of an example cloud computing environment that can be used in conjunction with the technologies described herein.

FIG. 9 depicts an example cloud computing environment 900 in which the described technologies can be implemented, including, e.g., the system disclosed above and other systems herein. The cloud computing environment 900 can include cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 can be utilized by various types of computing devices (e.g., client computing devices), such as computing devices 920, 922, and 923. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

Example 13—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 14—Example Embodiments

Any of the following example embodiments can be implemented.

Example 1. A computer-implemented method comprising: receiving a message sent from a source entity; performing first pre-processing operations for verifying validity of the message; performing second pre-processing operations for determining a category of the message; extracting metadata from the message; generating an enriched message comprising the metadata and the determined category; performing post-processing operations, wherein the post-processing operations comprise classifying the enriched message into one of a plurality of event types; broadcasting the enriched message by a message broker; and routing, by the message broker, the enriched message to one or more target entities registered an event type into which the message is classified.

Example 2. The method of example 1, wherein performing first pre-processing operations comprises checking compliance of the message against one or more predefined first message rules.

Example 3. The method of any one of examples 1-2, wherein performing first pre-processing operations comprises deriving one or more characteristics of the message based on one or more predefined second message rules and adding the one or more derived characteristics to the enriched message.

Example 4. The method of any one of examples 1-3, further comprising generating a plurality of topic clusters from a text corpus using latent Dirchlet analysis and creating a non-topic cluster different from the plurality of topic clusters, wherein the determined category corresponds to one of the topic or non-topic clusters.

Example 5. The method of example 4, further comprising generating a warning responsive to determining the determined category corresponds to the non-topic cluster.

Example 6. The method of any one of examples 4-5, wherein performing second pre-processing operations comprises determining similarity indexes between the message and the plurality of topic and non-topic clusters using contrastive learning.

Example 7. The method of example 6, wherein performing second pre-processing operations further comprises selecting a topic or non-topic cluster having the maximum similarity index to correspond to the determined category.

Example 8. The method of any one of examples 1-7, further comprising training a classifier using previously received messages and classified event types corresponding to the received messages.

Example 9. A computing system comprising: memory; one or more hardware processors coupled to the memory; and one or more computer readable storage media storing instructions that, when loaded into the memory, cause the one or more hardware processors to perform operations comprising: receiving a message sent from a source entity; performing first pre-processing operations for verifying validity of the message; performing second pre-processing operations for determining a category of the message; extracting metadata from the message; generating an enriched message comprising the metadata and the determined category; performing post-processing operations, wherein the post-processing operations comprise classifying the enriched message into one of a plurality of event types; broadcasting the enriched message by a message broker; and routing, by the message broker, the enriched message to one or more target entities registered an event type into which the message is classified.

Example 10. The system of example 9, wherein performing first pre-processing operations comprises checking compliance of the message against one or more predefined first message rules.

Example 11. The system of any one of examples 9-10, wherein performing first pre-processing operations comprises deriving one or more characteristics of the message based on one or more predefined second message rules and adding the one or more derived characteristics to the enriched message.

Example 12. The system of any one of examples 9-11, wherein the operations further comprise generating a plurality of topic clusters from a text corpus using latent Dirchlet analysis and creating a non-topic cluster different from the plurality of topic clusters, wherein the determined category corresponds to one of the topic or non-topic clusters.

Example 13. The system of example 12, wherein the operations further comprise generating a warning responsive to determining the determined category corresponds to the non-topic cluster.

Example 14. The system of any one of examples 12-13, wherein performing second pre-processing operations comprises determining similarity indexes between the message and the plurality of topic and non-topic clusters using contrastive learning.

Example 15. The system of example 14, wherein performing second pre-processing operations further comprises selecting a topic or non-topic cluster having the maximum similarity index to correspond to the determined category.

Example 16. The system of any one of examples 9-15, wherein the operations further comprise training a classifier using previously received messages and classified event types corresponding to the received messages.

Example 17. One or more non-transitory computer-readable media having encoded thereon computer-executable instructions causing one or more processors to perform a method comprising: receiving a message sent from a source entity; performing first pre-processing operations for verifying validity of the message; responsive to validity of the message being verified, performing second pre-processing operations for determining a category of the message; extracting metadata from the message; generating an enriched message comprising the metadata and the determined category; performing post-processing operations, wherein the post-processing operations comprise classifying the enriched message into one of a plurality of event types; broadcasting the enriched message by a message broker; and routing, by the message broker, the enriched message to one or more target entities registered an event type into which the message is classified, wherein performing first pre-processing operations comprises: checking compliance of the message against one or more predefined first message rules; deriving one or more characteristics of the message based on one or more predefined second message rules; and adding the one or more derived characteristics to the enriched message.

Example 18. The one or more non-transitory computer-readable media of example 17, wherein the method further comprises generating a plurality of topic clusters from a text corpus using latent Dirchlet analysis and creating a non-topic cluster different from the plurality of topic clusters, wherein the determined category corresponds to one of the topic or non-topic clusters.

Example 19. The one or more non-transitory computer-readable media of any one of examples 17-18, wherein performing second pre-processing operations comprises determining similarity indexes between the message and the plurality of topic and non-topic clusters using contrastive learning.

Example 20. The one or more non-transitory computer-readable media of any one of examples 17-19, wherein performing second pre-processing operations further comprises selecting a topic or non-topic cluster having the maximum similarity index to correspond to the determined category.

Example 15—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for improved entity communication automation in a heterogenous computing environment where a plurality of entities resides in a distributed network, the method comprising:
   receiving a message sent from a source entity in the heterogenous computing environment, wherein the message comprises a plurality of original attributes and values paired with the plurality of original attributes, wherein the plurality of original attributes indicates one or more operating conditions of the source entity;
   performing, by a pre-processing engine of a message broker, first pre-processing operations comprising:
   verifying validity of the message; and
   deriving one or more additional attributes of the message based on evaluating the plurality of original attributes and their paired values using one or more predefined derivative rules;
   generating, by the pre-processing engine of the message broker, an enriched message, wherein generating the enriched message comprises:
   adding the one or more additional attributes to the message;
   performing second pre-processing operations for determining a topic of the message based on measuring similarity between the message and a plurality of topic clusters and a non-topic cluster that were generated based on a text corpus; and
   adding to the message a new attribute paired with the topic of the message;

performing, by a post-processing engine of the message broker, post-processing operations, wherein the post-processing operations comprise classifying the enriched message into an event type selected from a plurality of event types;

broadcasting the enriched message by the message broker; and routing, by the message broker, the enriched message to one or more target entities in the heterogenous computing environment, wherein the one or more target entities have registered the event type.

2. The method of claim 1, wherein verifying validity of the message comprises checking compliance of the message against one or more predefined validity rules.

3. The method of claim 1, further comprising generating the plurality of topic clusters from the text corpus using latent Dirchlet analysis and creating the non-topic cluster different from the plurality of topic clusters, wherein the determined topic corresponds to one of the topic clusters or the non-topic cluster.

4. The method of claim 1, further comprising generating a warning responsive to determining the determined topic corresponds to the non -topic cluster.

5. The method of claim 1, wherein determining the topic of the message comprises calculating similarity indexes between the message and the plurality of topic clusters and the non-topic cluster using contrastive learning.

6. The method of claim 5, wherein determining the topic of the message further comprises selecting a topic cluster or non-topic cluster having the maximum similarity index as the determined topic.

7. The method of claim 1, further comprising training a classifier using previously received messages and classified event types corresponding to the received messages.

8. A computing system for improved entity communication automation in a heterogenous computing environment where a plurality of entities resides in a distributed network, the computing system comprising:

memory;

one or more hardware processors coupled to the memory; and one or more computer readable storage media storing instructions that, when loaded into the memory, cause the one or more hardware processors to perform operations comprising:

receiving a message sent from a source entity in the heterogenous computing environment, wherein the message comprises a plurality of original attributes and values paired with the plurality of original attributes, wherein the plurality of original attributes indicates one or more operating conditions of the source entity;

performing, by a pre-processing engine of a message broker, first pre-processing operations comprising:

verifying validity of the message; and deriving one or more additional attributes of the message based on evaluating the plurality of original attributes and their paired values using one or more predefined derivative rules;

generating, by the pre-processing engine of the message broker, an enriched message, wherein generating the enriched message comprises:

adding the one or more additional attributes to the message;

performing second pre -processing operations for determining a topic of the message based on measuring similarity between the message and a plurality of topic clusters and a non-topic cluster that were generated based on a text corpus; and adding to the message a new attribute paired with the topic of the message;

performing, by a post-processing engine of the message broker, post-processing operations, wherein the post-processing operations comprise classifying the enriched message into an event type selected from a plurality of event types;

broadcasting the enriched message by the message broker; and routing, by the message broker, the enriched message to one or more target entities in the heterogenous computing environment, wherein the one or more target entities have registered the event type.

9. The system of claim 8, wherein verifying validity of the message comprises checking compliance of the message against one or more predefined validity rules.

10. The system of claim 8, wherein the operations further comprise generating the plurality of topic clusters from the text corpus using latent Dirchlet analysis and creating the non-topic cluster different from the plurality of topic clusters, wherein the determined topic corresponds to one of the topic clusters or the non-topic cluster.

11. The system of claim 8, wherein the operations further comprise generating a warning responsive to determining the determined topic corresponds to the non-topic cluster.

12. The system of claim 8, wherein determining the topic of the message comprises calculating similarity indexes between the message and the plurality of topic clusters and the non-topic cluster using contrastive learning.

13. The system of claim 12, wherein determining the topic of the message further comprises selecting a topic cluster or non-topic cluster having the maximum similarity index as the determined topic.

14. The system of claim 8, wherein the operations further comprise training a classifier using previously received messages and classified event types corresponding to the received messages.

15. One or more non-transitory computer-readable media having encoded thereon computer-executable instructions causing one or more processors to perform a method for improved entity communication automation in a heterogenous computing environment where a plurality of entities resides in a distributed network, the method comprising:

receiving a message sent from a source entity in the heterogenous computing environment, wherein the message comprises a plurality of original attributes and values paired with the plurality of original attributes, wherein the plurality of original attributes indicates one or more operating conditions of the source entity;

performing, by a pre-processing engine of a message broker, first pre-processing operations comprising:

verifying validity of the message; and deriving one or more additional attributes of the message based on evaluating the plurality of original attributes and their paired values using one or more predefined derivative rules;

generating, by the pre-processing engine of the message broker, an enriched message, wherein generating the enriched message comprises:

adding the one or more additional attributes to the message;

performing second pre -processing operations for determining a topic of the message based on measuring similarity between the message and a plurality of topic clusters and a non-topic cluster that were generated based on a text corpus; and adding to the message a new attribute paired with the topic of the message;

performing, by a post-processing engine of the message broker, post-processing operations, wherein the post-processing operations comprise classifying the enriched message into an event type selected from a plurality of event types;

broadcasting the enriched message by the message broker; and routing, by the message broker, the enriched message to one or more target entities in the heterogenous computing environment, wherein the one or more target entities have registered the event type, wherein performing first pre-processing operations comprises:

checking compliance of the message against one or more predefined validity rules; and generating a warning responsive to finding that the message violates one of the predefined validity rules.

16. The one or more non-transitory computer-readable media of claim 15, wherein the method further comprises generating the plurality of topic clusters from the text corpus using latent Dirchlet analysis and creating the non-topic cluster different from the plurality of topic clusters, wherein the determined topic corresponds to one of the topic clusters or the non-topic cluster.

17. The one or more non-transitory computer-readable media of claim 15, wherein determining the topic of the message comprises calculating similarity indexes between the message and the plurality of clusters and the non-topic cluster using contrastive learning.

18. The one or more non-transitory computer-readable media of claim 15, wherein determining the topic of the message further comprises selecting a topic cluster or non-topic cluster having the maximum similarity index as the determined topic.

* * * * *